United States Patent [19]
Robinson

[11] Patent Number: 5,717,799
[45] Date of Patent: Feb. 10, 1998

[54] OPTICAL WAVEGUIDE FILTERS

[75] Inventor: Alan Robinson, Harlow, United Kingdom

[73] Assignee: Northern Telecom Limited, Montreal, Canada

[21] Appl. No.: 731,168

[22] Filed: Oct. 10, 1996

[51] Int. Cl.[6] .................................................... G02B 6/34
[52] U.S. Cl. ............................................................ 385/37
[58] Field of Search ........................ 385/37, 10; 359/566, 359/569, 572, 573, 575

[56] References Cited

U.S. PATENT DOCUMENTS 5,058,977  10/1991  Sorin ........................................ 385/37
5,367,588  11/1994  Hill et al. ................................ 385/37

*Primary Examiner*—John Ngo
*Attorney, Agent, or Firm*—John D. Crane; Robert C. Klinger

[57] ABSTRACT

A distributed Bragg reflection pass-band filter in an optical fiber waveguide is provided by grating elements arranged to provide improved flatness of reflection pass-band, a high rate of roll-off, and reduced amplitude side-bands by the use of chirp and apodisation profiles that are related such that the square of the coupling coefficient is substantially proportional to the rate of change of chirp.

4 Claims, 17 Drawing Sheets

OPTICAL WAVEGUIDE FILTERS

BACKGROUND TO THE INVENTION

This invention relates to optical waveguides filters, and in particular to such filters of the distributed Bragg grating reflector type.

An optical waveguide, typically an optical fibre, provided with a distributed Bragg reflection grating of uniform amplitude and pitch and of low peak reflectance has a spectral reflectance characteristic of the general shape depicted in FIG. 1 and has a spectral width inversely proportional to grating length. The specific characteristic of FIG. 1 is in respect of a 1 mm long grating and with a centre wavelength $\lambda_c=1550$ nm and a coupling coefficient $\kappa=1$ mm$^{-1}$, created in a waveguide with an effective refractive index $n_{eff}=1.45$. FIG. 1 shows that the pass-band reflectance is non-uniform, and that there are side-bands of significant amplitude on both sides of the pass-band. A more uniform (flatter) pass-band can be obtained by changing from a low peak reflectance grating to a saturated grating in which peak reflectance approaches unity, as depicted in the spectral reflectance characteristic of FIG. 2, but this flatter pass-band is achieved at the expense of an increase in the amplitude of the side-bands. The specific characteristic of FIG. 2 is in respect of a filter having the same parameters as that of the filter of FIG. 1 except for the magnitude of the coupling coefficient, which is changed from $\kappa=1$ mm$^{-1}$ to $\kappa=3$ mm$^{-1}$.

The side-band level of the filter of FIG. 2 can be reduced by apodisation (shading) of the grating amplitude in such a way that the strongest coupling occurs at the centre of the grating, with the coupling coefficient decaying smoothly away to a low value at each end of the grating. The strength of shading of such a grating will be referred to in terms of a dimensionless quantity, its normalised half-width, which for the purposes of this specification is defined as half the distance along the length of the grating over which the coupling coefficient ($\kappa$) is at least $e^{-1}$ times its maximum value $\kappa_0$, expressed as a fraction of the total length of the grating.

FIG. 3 depicts a Gaussian shading over a 5 mm long grating for which the normalised shading half width is 0.2, and FIG. 4 depicts the spectral reflectance characteristic of a filter with the shading of FIG. 3 in which the effective refractive index and centre wavelength are, as before, respectively $n_{eff}=1.45$ and $\lambda_c=1550$ nm, and in which the peak coupling coefficient $\kappa_0=0.2$ mm$^{-1}$. This spectral characterisation of FIG. 4 shows that the apodisation has greatly reduce the side-band amplitude of <80 dB, but left a relatively highly non-uniform amplitude pass-band.

The spectral pass-band can be somewhat widened, and its lack of uniformity reduced, by increasing the coupling coefficient. This is shows by the comparing of the spectral reflectance characteristic of FIG. 4, with that of FIG. 5. FIG. 5 is the characteristic of a filter with the same parameters as that of the filter of FIG. 4, except for a twenty-fold increase of the peak coupling coefficient $\kappa_0$ from 0.2 to 4 mm$^{-1}$, and for a doubling of the length of the grating to 10 mm, while halving the normalised half-width, so that the decay rate is identical to that of FIG. 4 in the central region, but does not suffer the same truncation at ±2.5 mm. The higher coupling coefficient increased the spectral width to approximately 2 nm, while the longer overall length and less severe truncation of the Gaussian apodisation reduces the level of the out of band reflectance.

By this apodisation means, and with currently available technology for grating fabrication using the photorefractive effect, it is possible to make filters with spectral widths of 2 to 3 nm, but it becomes increasingly difficult to expand the spectral width much further. The reason for this is that an expanded spectral width implies a higher peak reflectance, which in turn implies a larger peak coupling coefficient or a longer grating. There is a practical limit to the magnitude of photorefractive effect refractive index change achievable, and lengthening the grating increases the deleterious impact of phase noise and other imperfections in the grating upon the out-of-band response of the filter.

An alternative way of providing an enlarged pass-band is to employ a chirped grating, i.e. a grating the value of whose Bragg wavelength is not constant, but is a function of position along the length of the grating. The Bragg wavelength at a particular position in a chirped grating is determined by its optical pitch $\Lambda$ at that position, the optical pitch being defined as the product of the physical pitch of the grating elements at that position with the effective refractive index presented to light guided by the waveguide at that position. A linearly chirped grating suffers from side-bands, similar to those of an unchirped grating. These can be suppressed by apodisation, but heavily apodised uniformly chirped gratings typically exhibit significantly non-uniform spectral pass-band transmission and reflective characteristics.

SUMMARY OF THE INVENTION

The present invention is directed to the obtaining of filters that exhibit more uniform pass bands, good suppression of side-bands, and relatively sharp roll-off between pass-bands and side-bands.

According to the present invention there is provided an optical waveguide provided with a distributed Bragg grating reflector having grating elements apodised to provide a coupling coefficient, $\kappa$, that is a function of axial distance z along the waveguide, and chirped to provide an optical pitch, $\Lambda$, that is also a function of axial distance z, wherein the rate of change with axial distance of optical pitch is non-linear and substantially proportional to the square of the coupling coefficient.

BRIEF DESCRIPTION OF THE DRAWINGS

There follows a description of optical waveguide distributed Bragg reflection filters embodying the invention in preferred forms. The description refers to the accompanying drawings in which.

DETAILED DESCRIPTION OF PREFERRED EMBODIMENTS

It has been explained above how apodisation can be employed to reduce the amplitude of unwanted side-bands of a uniform pitch distributed Bragg grating reflection filter, and it has also been explained that an unapodised linearly chirped distributed Bragg grating reflection filter has side-bands at least somewhat similar to those of an unapodised uniform pitch grating reflection filter. The effects of illustrative examples of different apodisations upon a linearly chirped grating reflection filter can be seen from FIGS. 6 to 9. In traces 60, 61 and 62 of FIG. 6 there are depicted three different illustrative examples of different apodisation profile. Trace 60 is a simple Gaussian profile, while traces 61 and 62 are split-Gaussian profiles. For the purposes of this specification by the term split-Gaussian profile is meant a profile resulting from the insertion of a plateau at the peak of a Gaussian profile dividing that profile into two separated halves joined by the plateau. In describing a split-Gaussian profile, reference will additionally be made to a second dimensionless quantity, normalised transition half-width, which for the purposes of this specification is defined as half the difference between the length of the plateau and the length over which the coupling coefficient κis at least $e^{-1}$ times its maximum (plateau) value $\kappa_0$, this difference being expressed as a fraction of the total length of the grating. (This definition of normalised transition half-width means that the conversion of a Gaussian profile to a split-Gaussian profile by the insertion of a plateau produces a value of normalised half-transition width for the split-Gaussian profile equal to the normalised half-width of the Gaussian profile that existed prior to the insertion of the plateau). The normalised (Gaussian) half-width for each of the Gaussian traces 60, 61 and 62 is 0.25, and their normalised transition half-widths are respectively 0.25, 0.06 and 0.02.

Figure 7:
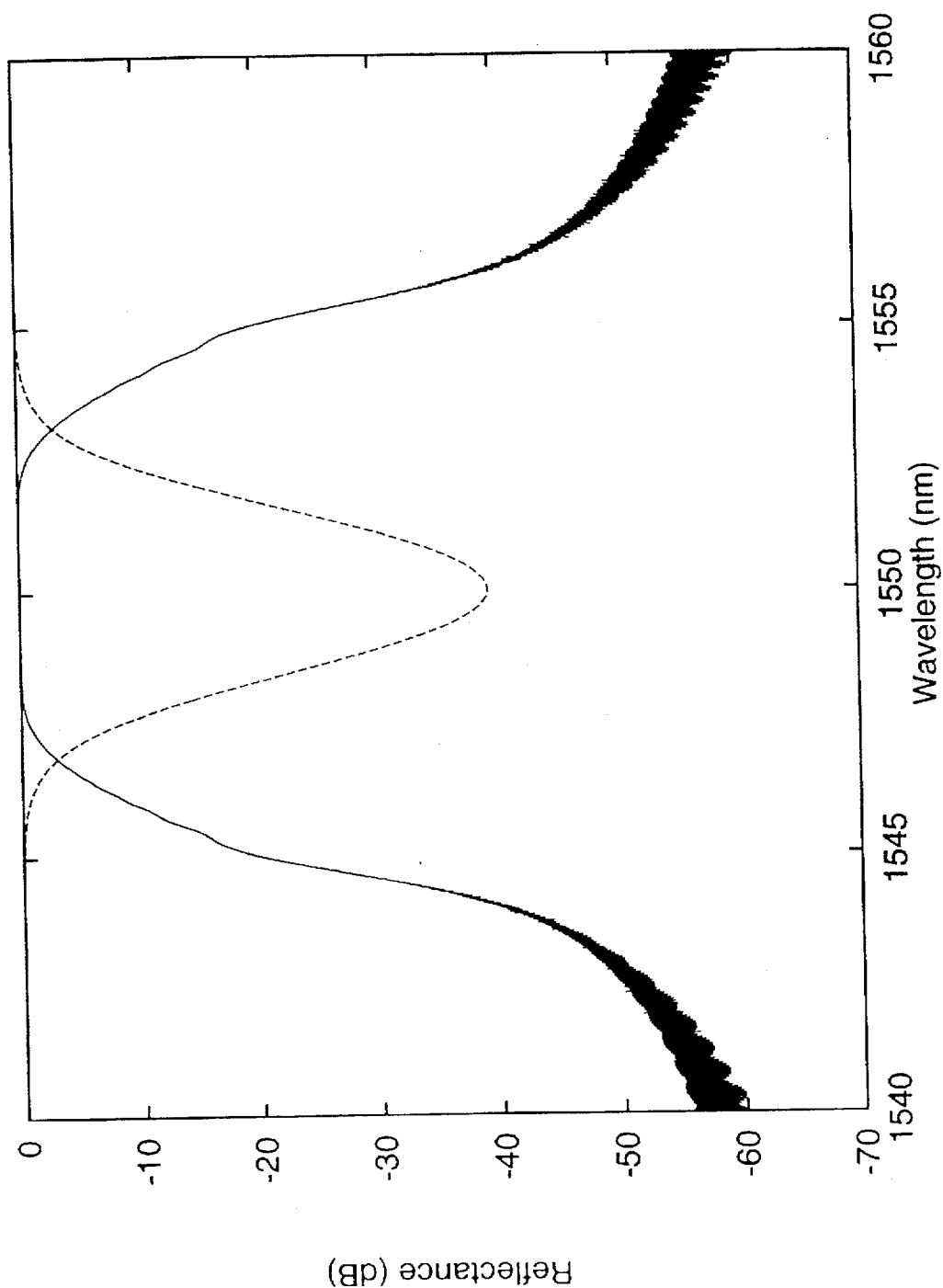
FIGS. 7, 8 and 9 depict plots of the spectral reflectance and transmittance characteristics of three linearly chirped filters respectively having the apodisation profiles of the three plots of FIG. 6, FIGS. 10, 11 and 12 depict plots of the spectral reflectance and transmittance characteristics of three filters corresponding to those of FIGS. 7, 8 and 9, but with non-linear instead of linear chirps.
Figure 8:
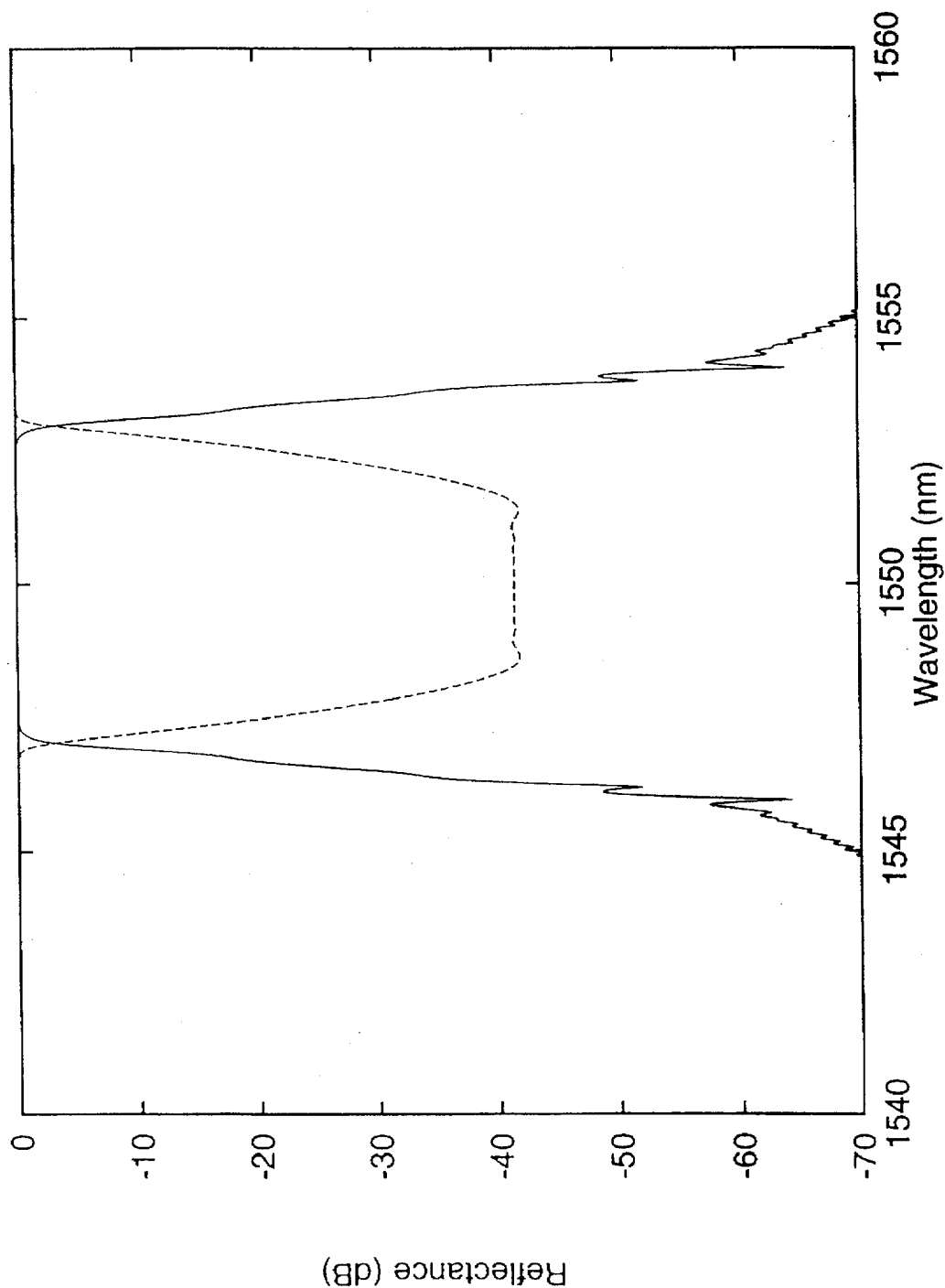
Figure 9:
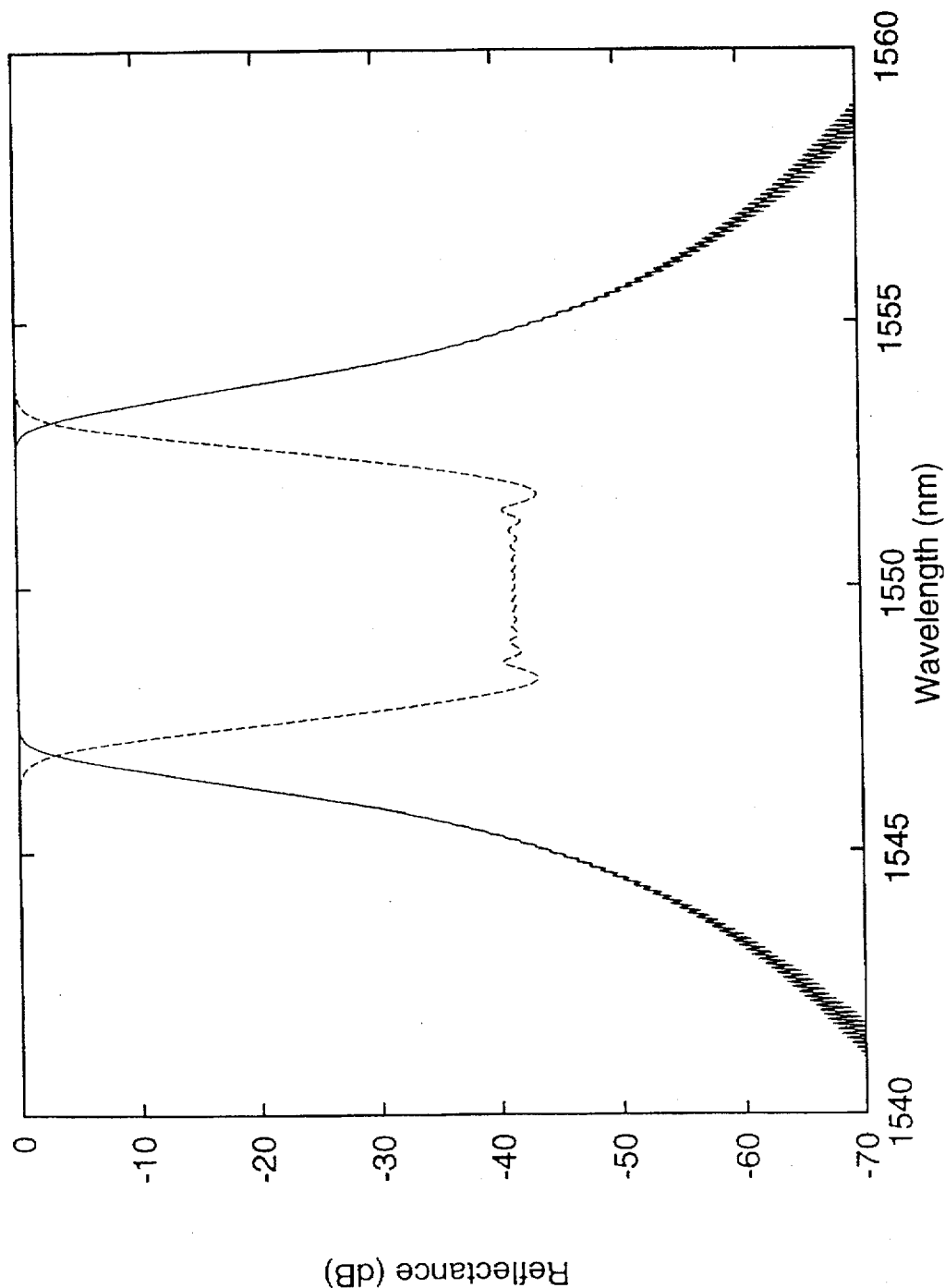

FIGS. 7, 8 and 9 are computed spectral reflectance and transmittance plots for linearly chirped gratings respectively having the shading profiles of traces 60, 61 and 62, the chirp being at the rate of 350 ppm/mm. In each of FIGS. 7, 8 and 9, and also in each of FIGS. 10 to 16, the reflectance plot is represented by a solid line and the transmittance plot by a broken line. A comparison between FIGS. 7, 8 and 9 reveals that changing from the Gaussian shading profile of the FIG. 7 grating to the split Gaussian profile of the FIG. 8 grating has the effect of steepening the roll-off and flattening the pass-band; whereas continuing the process to reduce still further the normalised transition half-width from its FIG. 8 value of 0.06 to its FIG. 9 value of 0.02 has the effect of cancelling some of the improvement in roll-off rate, and of introducing a more pronounced ripple into the reflectance pass-band (transmittance stop-band), a ripple whose amplitude is greatest near the extremities of that band.

The traces of FIGS. 7 to 9 demonstrate that the side-bands of a uniformly linearly chirped grating can be at least somewhat suppressed by apodisation, but that heavily apodised uniformly chirped gratings exhibit non-uniform pass-band transmission and reflection characteristics. To achieve a relatively flat pass-band together with a reasonably rapid roll-off outside the pass-band, requires careful selection of apodisation profile. The suppression of side-bands by a smooth decrease in grating amplitude must be balanced against the resultant broadening of the spectral transition induced by the grating chirp.

Attention is now turned specifically to embodiments of the present invention, embodiments in which the coupling coefficient κis apodised (varied as a function of distance along the grating) in a manner to provide reduced amplitude side-bands, and in which the chirp rate varies non-linearly in direct proportion to the square of the coupling co-efficient $$\kappa^2, (d\Lambda/dz \propto \kappa^2)$$

such a relationship being found, at least in the case of Gaussian and split-Gaussian apodisation profiles, to provide a pass-band reflectance with a high degree of flatness.

For a Gaussian apodisation profile, the required index or grating spatial frequency chirp has a spatial distribution defined by the error function, with the coupling coefficient apodisation $$\kappa(z) = \kappa_0 e^{-\frac{z^2}{w^2}}$$

the grating spatial frequency $$\beta_g(z) = \beta_{g0} + \frac{1}{2}(\beta_{max} - \beta_{min}) erf\left(\sqrt{2}\ \frac{z}{w}\right)$$

Figure 1:
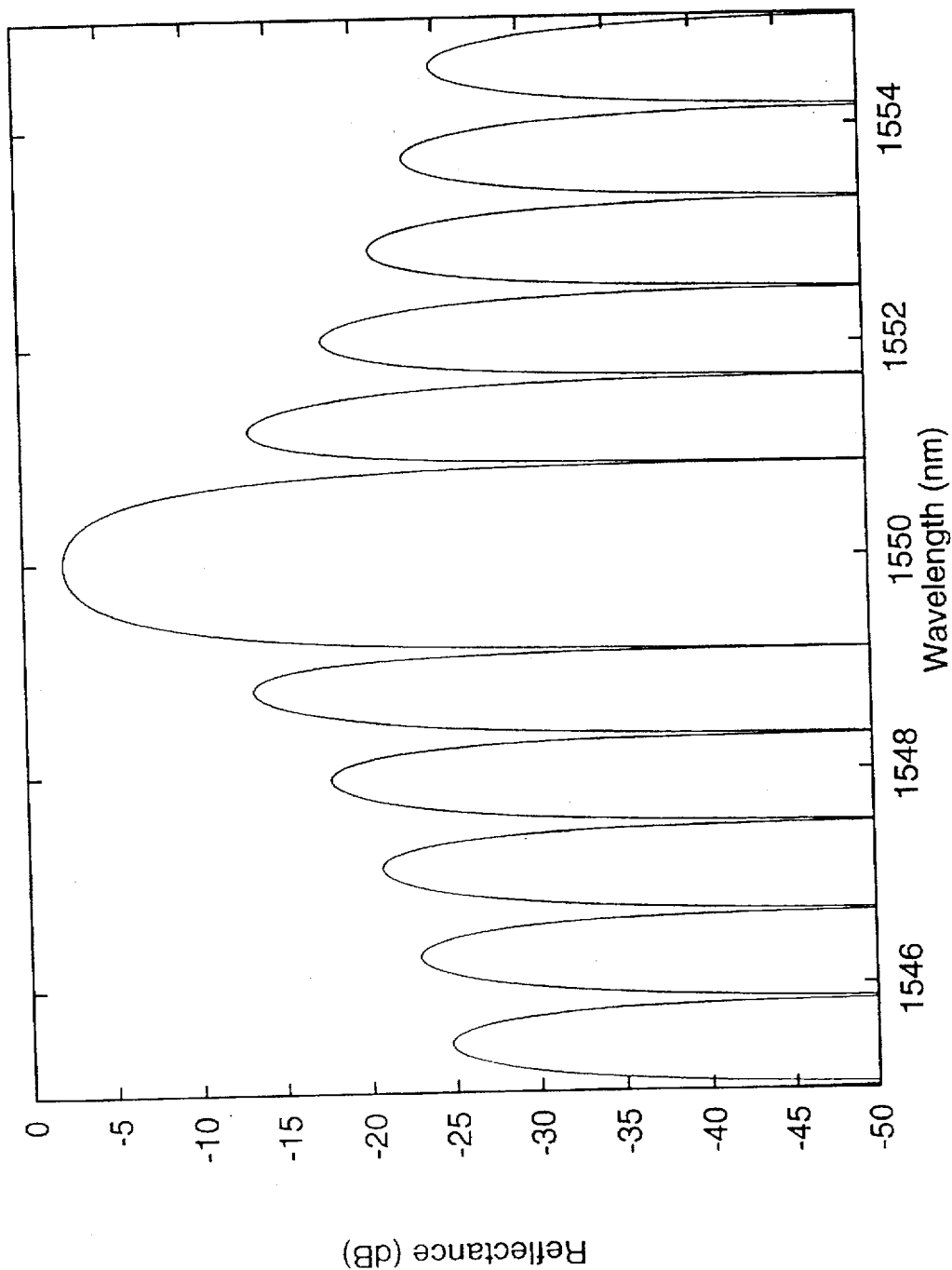
FIGS. 1 and 2 are plots of the spectral reflectance characteristics of two distributed Bragg grating reflection filters of uniform amplitude and pitch, and of respectively lower and higher peak reflectance.
Figure 2:
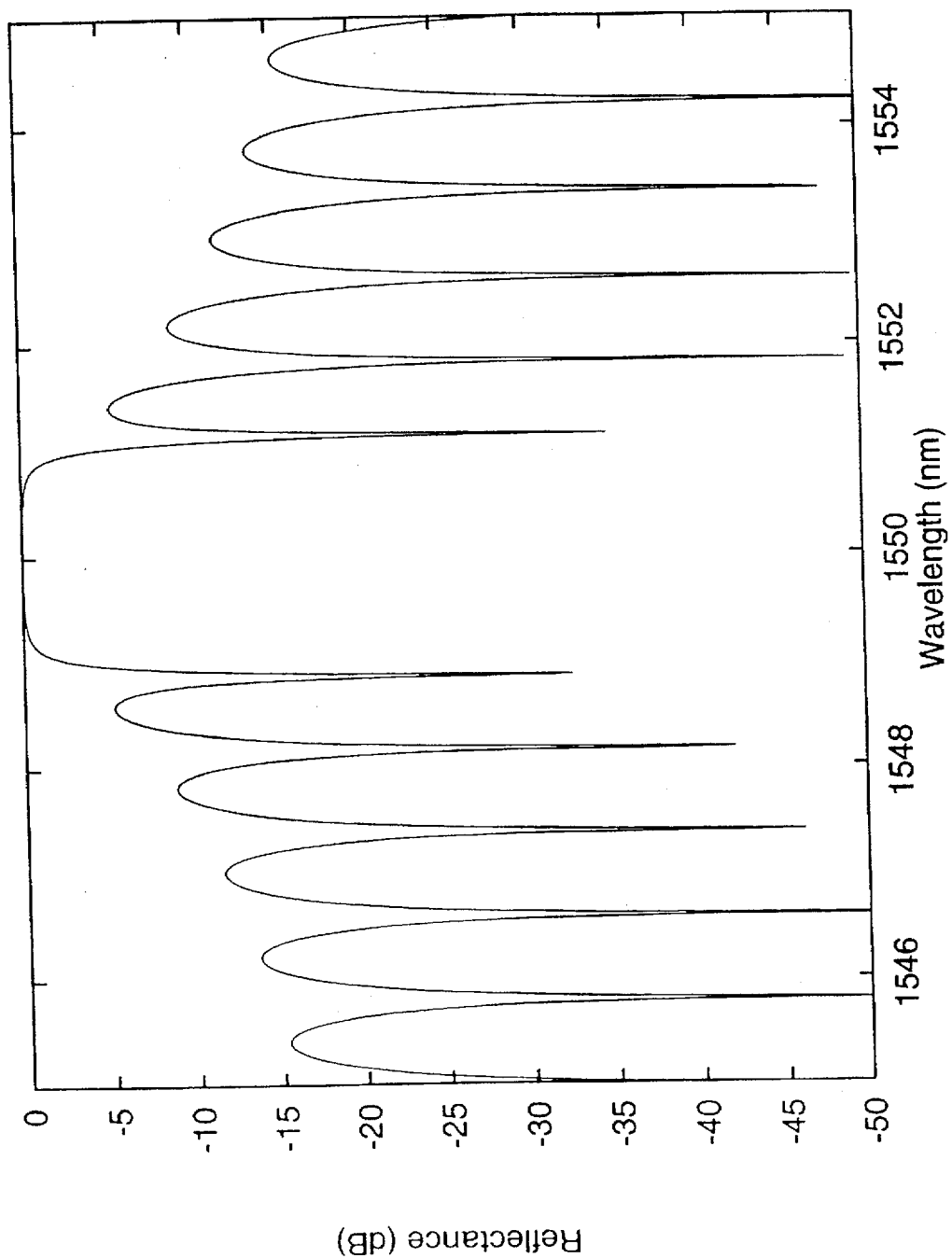
Figure 3:
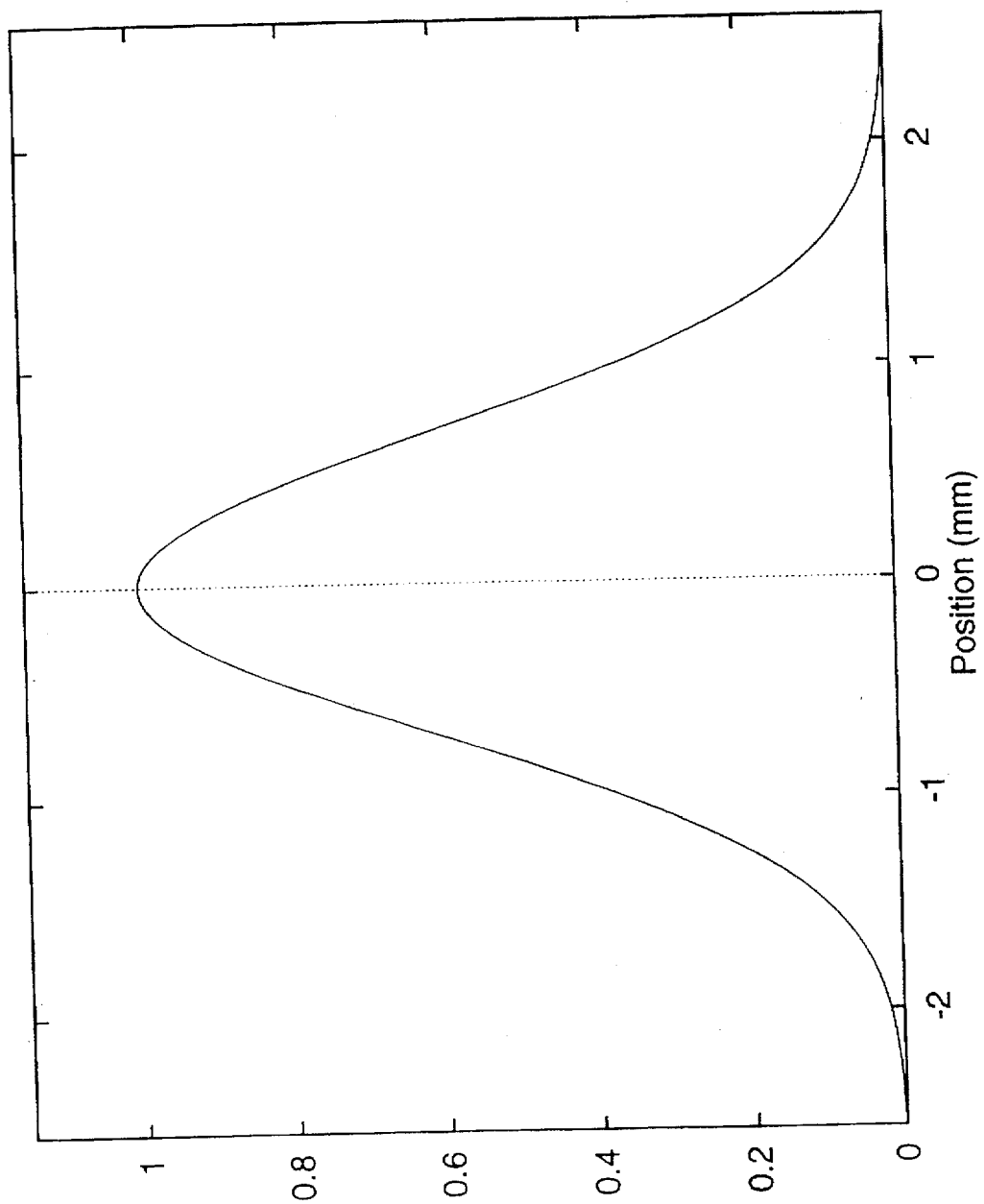
FIG. 3 is a plot of the Gaussian apodisation of a distributed Bragg grating reflection filter of uniform pitch.
Figure 4:
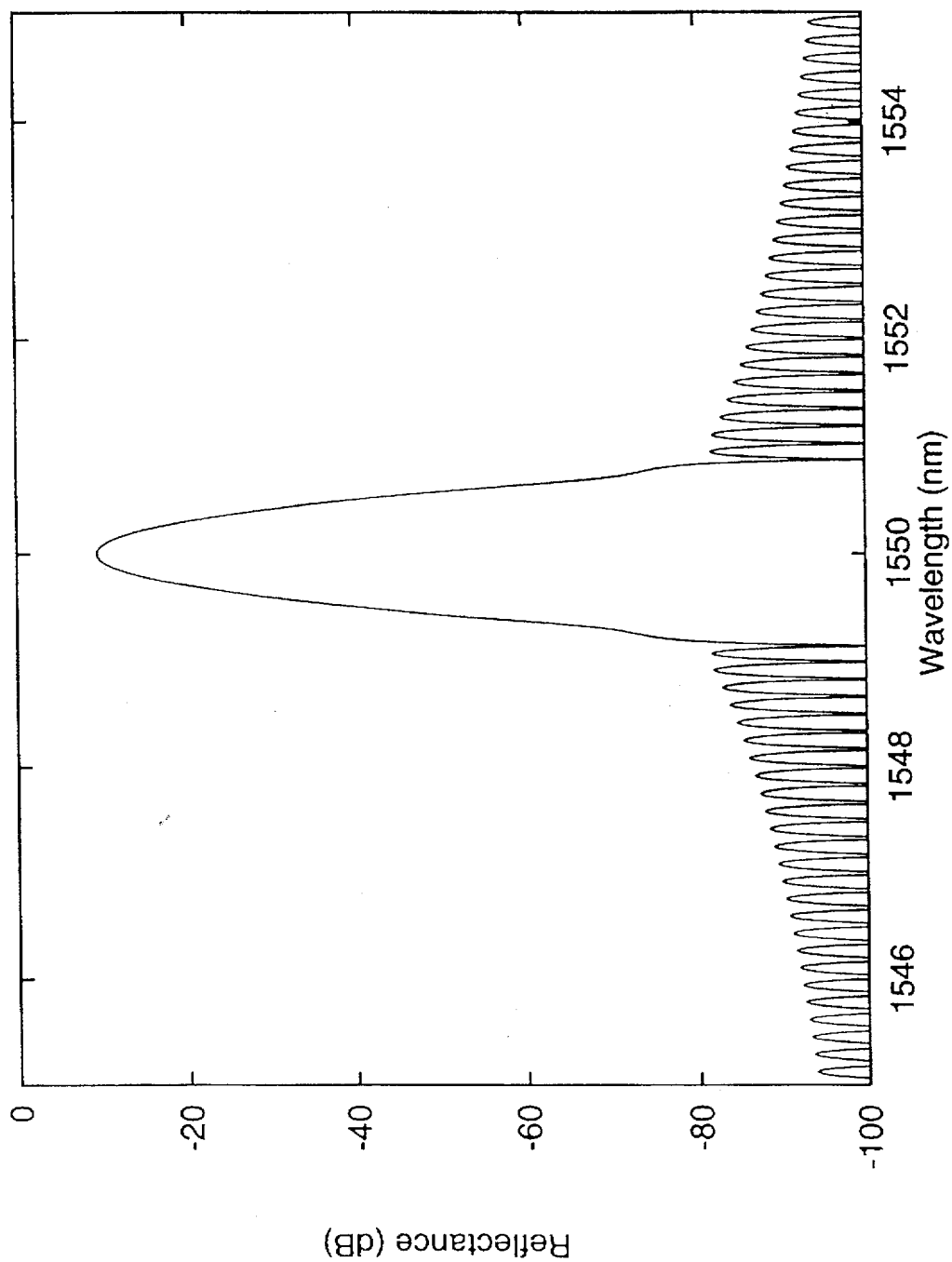
FIG. 4 is a plot of the spectral reflectance characteristic of the grating of FIG. 3.
Figure 5:
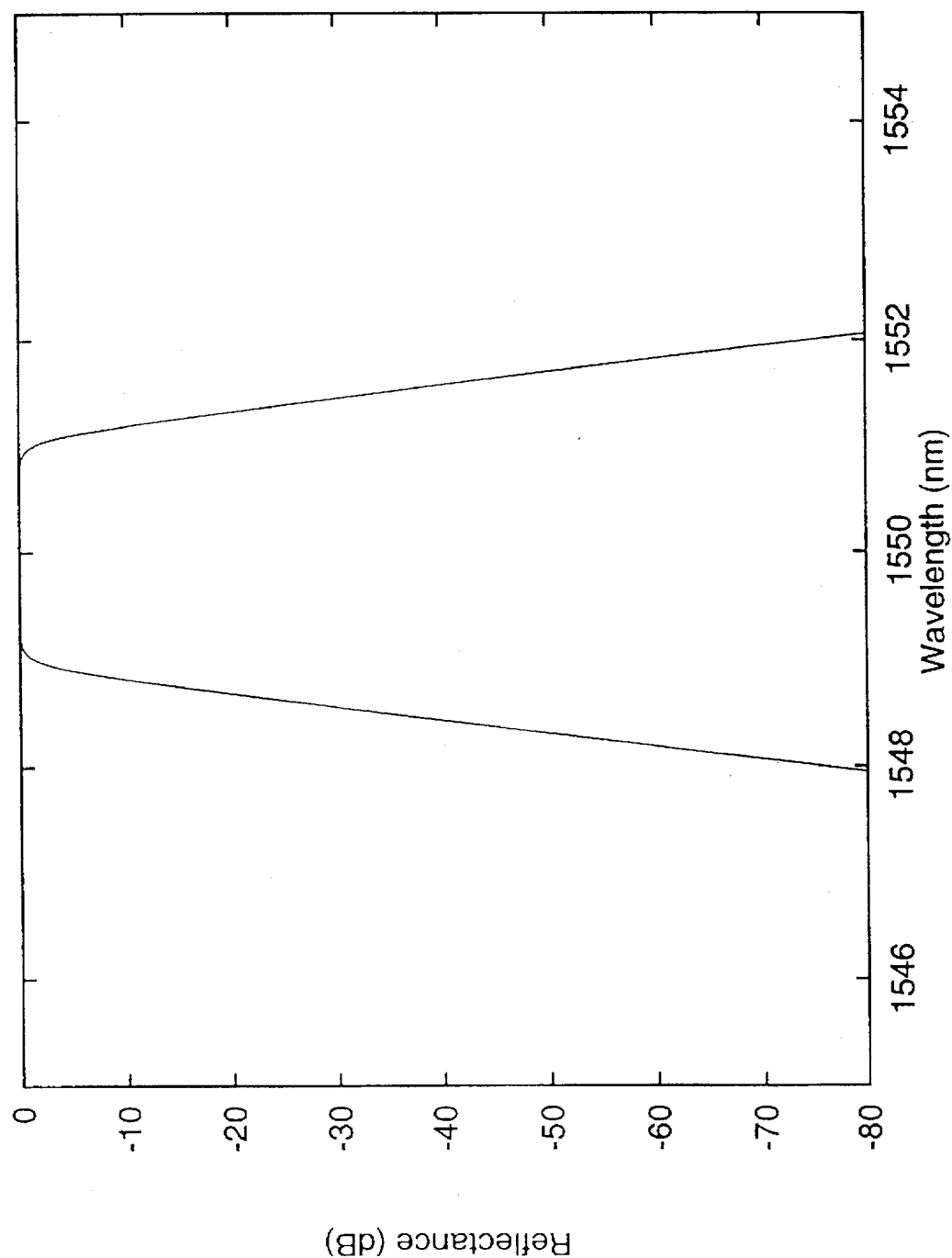
FIG. 5 is a plot of the spectral reflectance characteristic of a grating primarily distinguished from that of FIG. 3 by having twenty times the magnitude of peak coupling coefficient $\kappa_0$.
Figure 6:
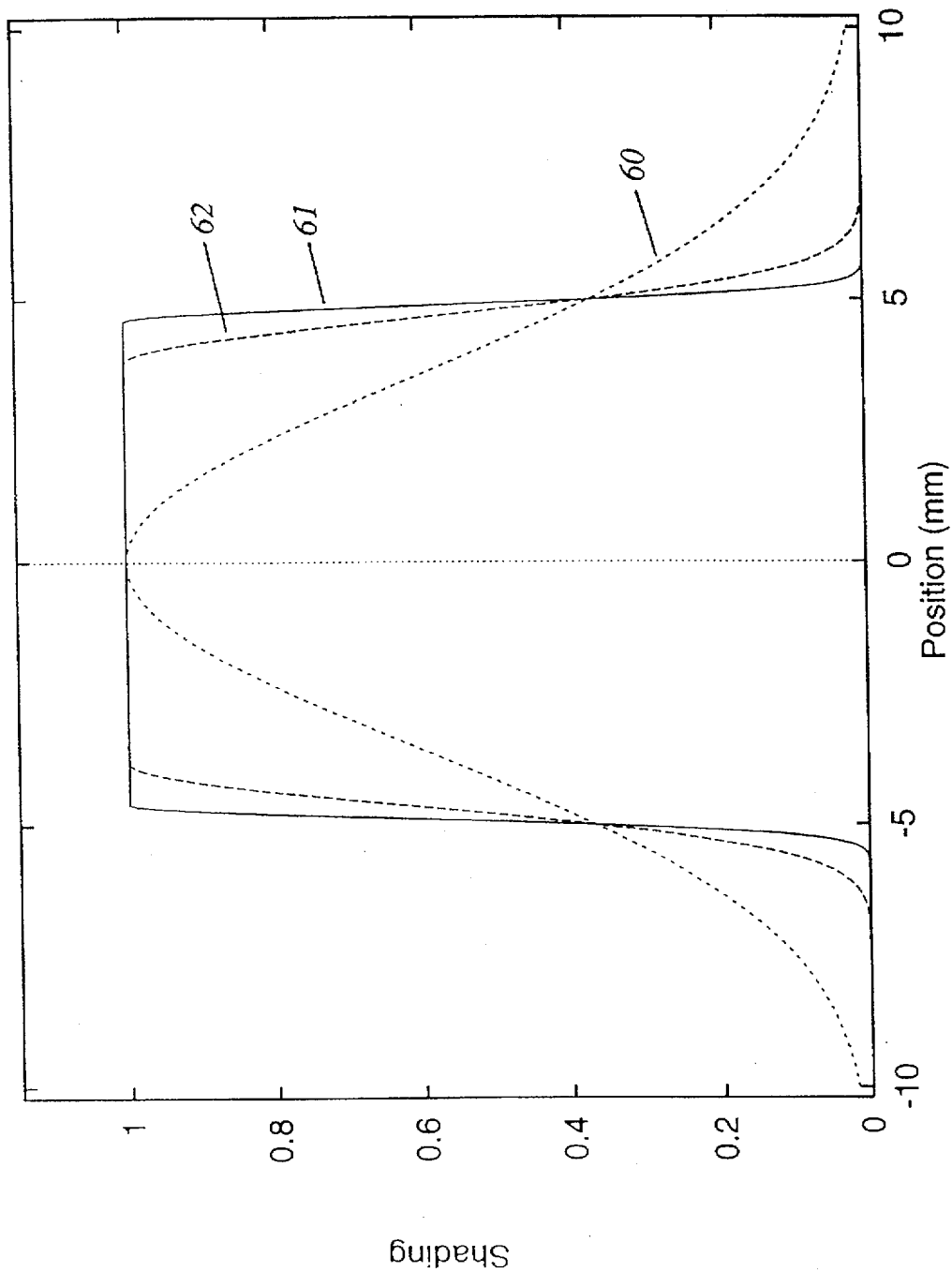
FIG. 6 depicts plots of a Gaussian and two split-Gaussian apodisation profiles.
Figure 10:
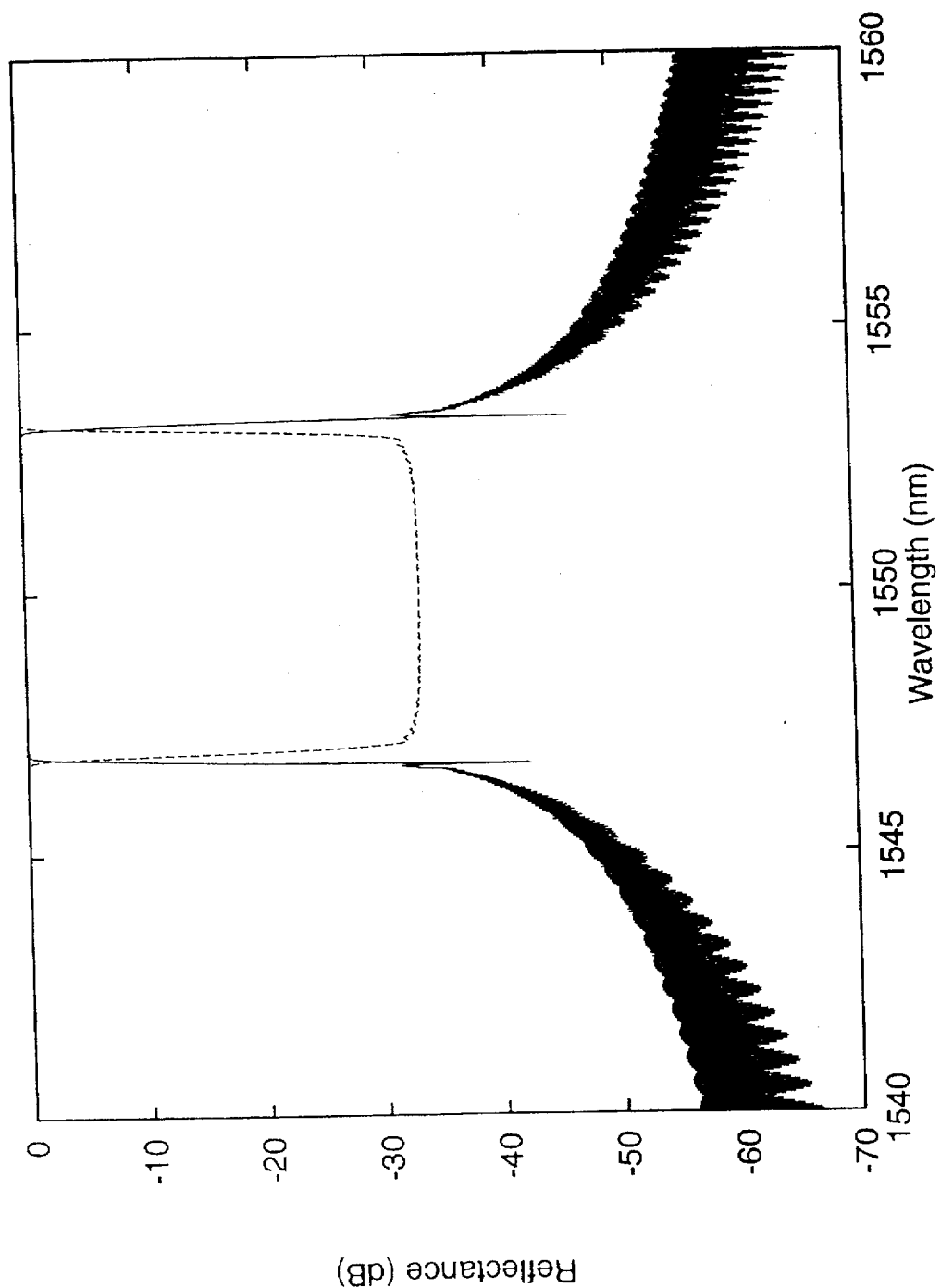
Figure 11:
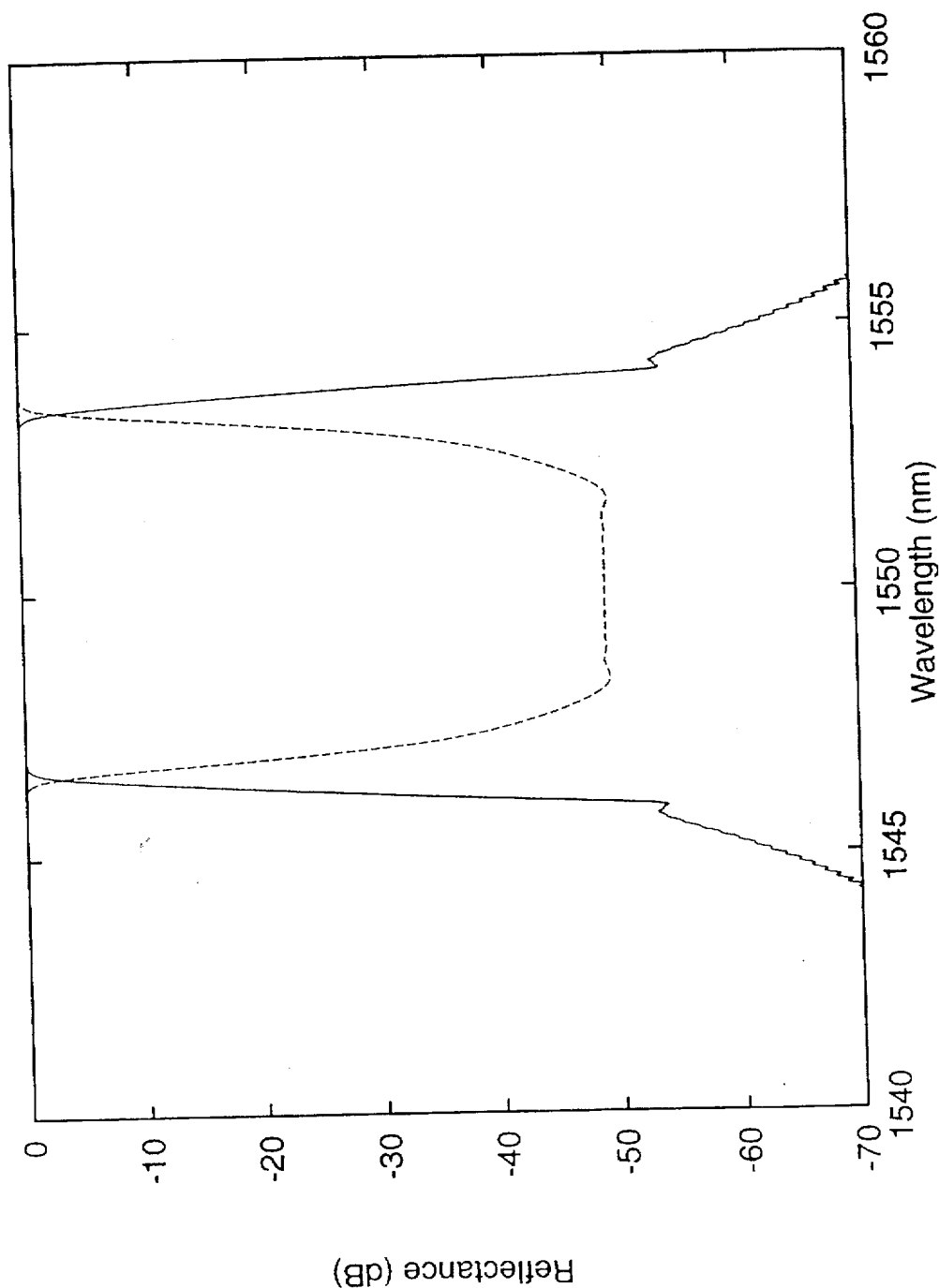

FIGS. 7, 8 and 9 show the computed spectral reflectance and transmittance characteristics of three linearly chirped filters with apodisations respectively as indicated by the traces 60, 61 and 62 of FIG. 6. Correspondingly, FIGS. 10, 11 and 12 show the computed spectral reflectance and transmittance characteristics of three filters which similarly have apodisations respectively as indicated by the traces 60, 61 and 62 of FIG. 6, but in this instance filters that are non-linearly chirped so that the rate of chirp varies, in each instance, in direct proportion to $\kappa^2$.

Figure 12:
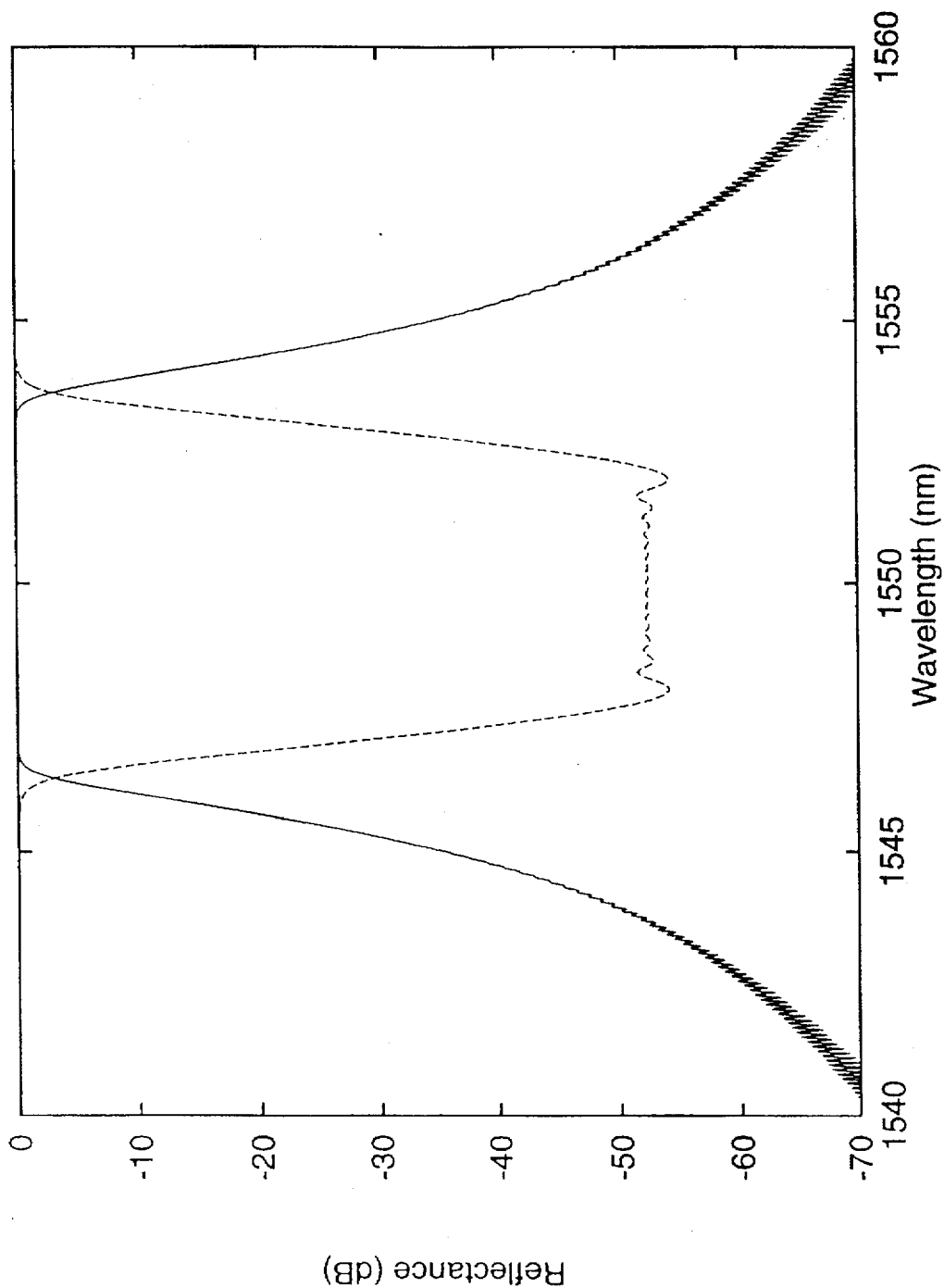
Figure 13:
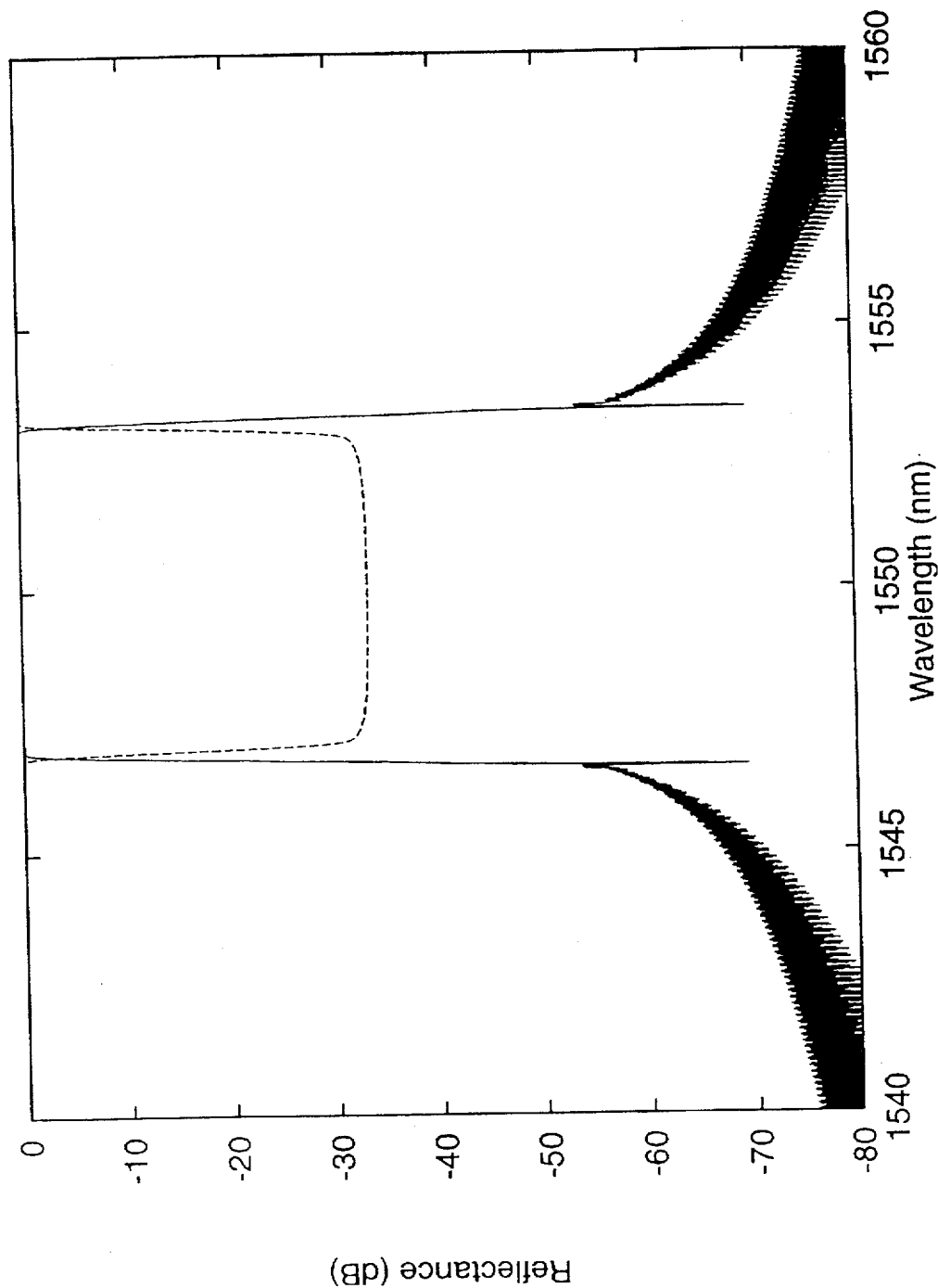
FIG. 13 depicts plots of the spectral reflectance and transmittance characteristics of a lengthened version of the filter of FIG. 10.

A comparison of FIG. 12 with FIG. 9 reveals that, in respect of the split-Gaussian filters with the smaller value of normalised transition half-width, the changeover from linear to non-linear chirp makes relatively little difference to either the rate of roll-off outside the reflection pass-band, or to the amplitude of the ripple within it. Comparing FIG. 11 with FIG. 8 reveals that, in making the changeover from linear to non-linear chirp, the rate of roll-off improvement is more pronounced in the case of the filters with the larger value of normalised transition half-width. Finally, a comparison of FIG. 10 with FIG. 7 reveals that the changeover from linear to non-linear chirp in respect of the Gaussian shading profile filters produces an even stronger improvement in the rate of roll-off, this being accompanied by a much flatter characteristic within the reflection pass-band. Against this must be set the fact that the side-bands are rather more pronounced. These side-bands arise from truncation effects which are greater in respect of the Gaussian shading profile filter of FIG. 10 than in respect of the split-Gaussian filters of FIGS. 11 and 12. FIG. 13 shows that, by increasing the length of the grating, these side-bands can be reduced in amplitude. FIG. 13 shows the computed spectral reflectance and transmittance characteristics of a filter that differs from that of FIG. 10 in two respects, namely that the grating length has been increased from 20 to 25 mm, and the normalised half-width has been correspondingly reduced from 0.25 to 0.2. (The reduction in normalised half-width is provided so that the two filters are identical over the central 20 mm; the extra 2.5 mm at each end of the longer filter being used to accommodate a further reduction in amplitude of the coupling coefficient, and hence reduce the magnitude of truncation effects).

Figure 14:
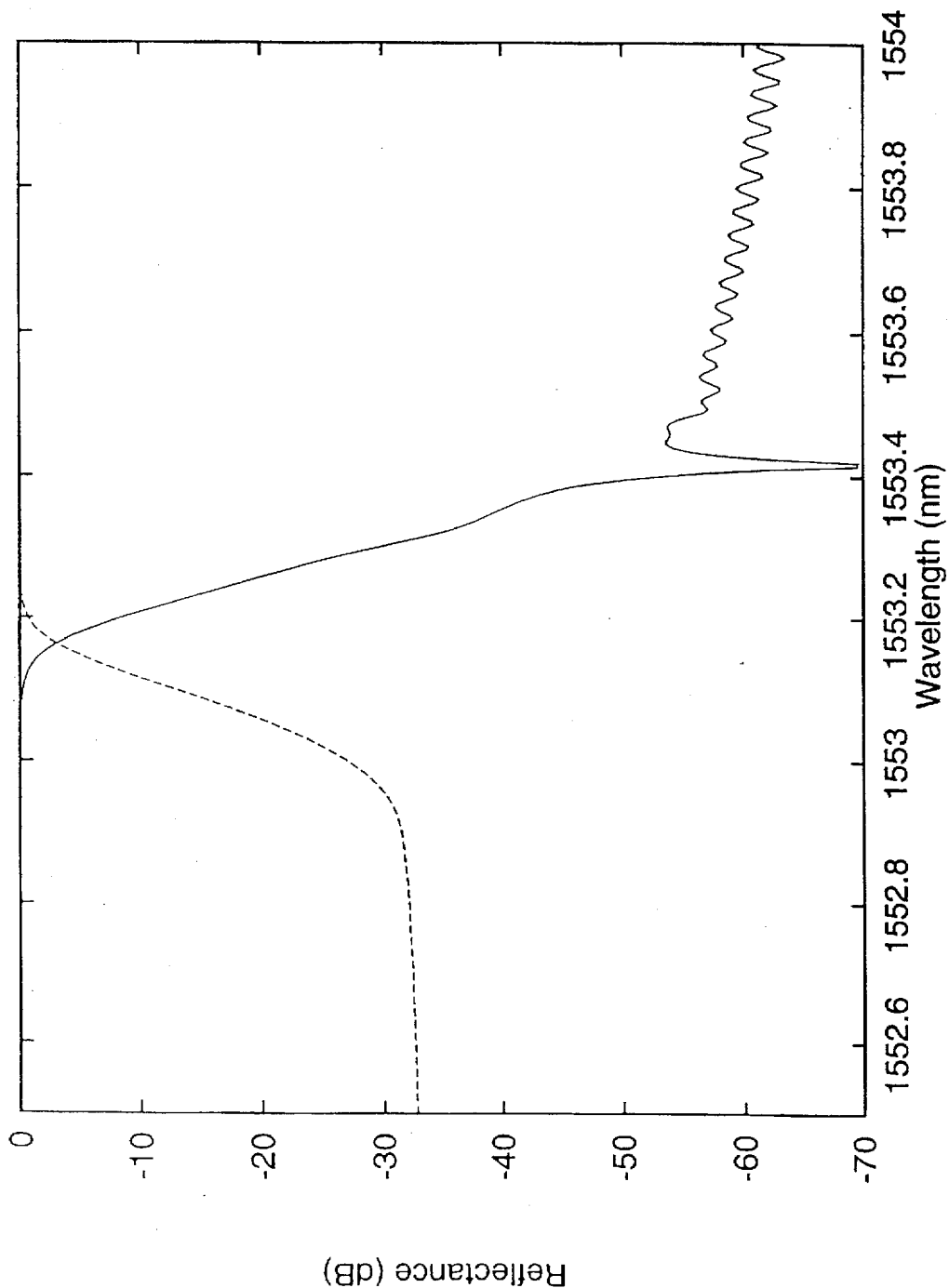
FIG. 14 depicts on a larger scale a portion of the plots of FIG. 13.
Figure 15:
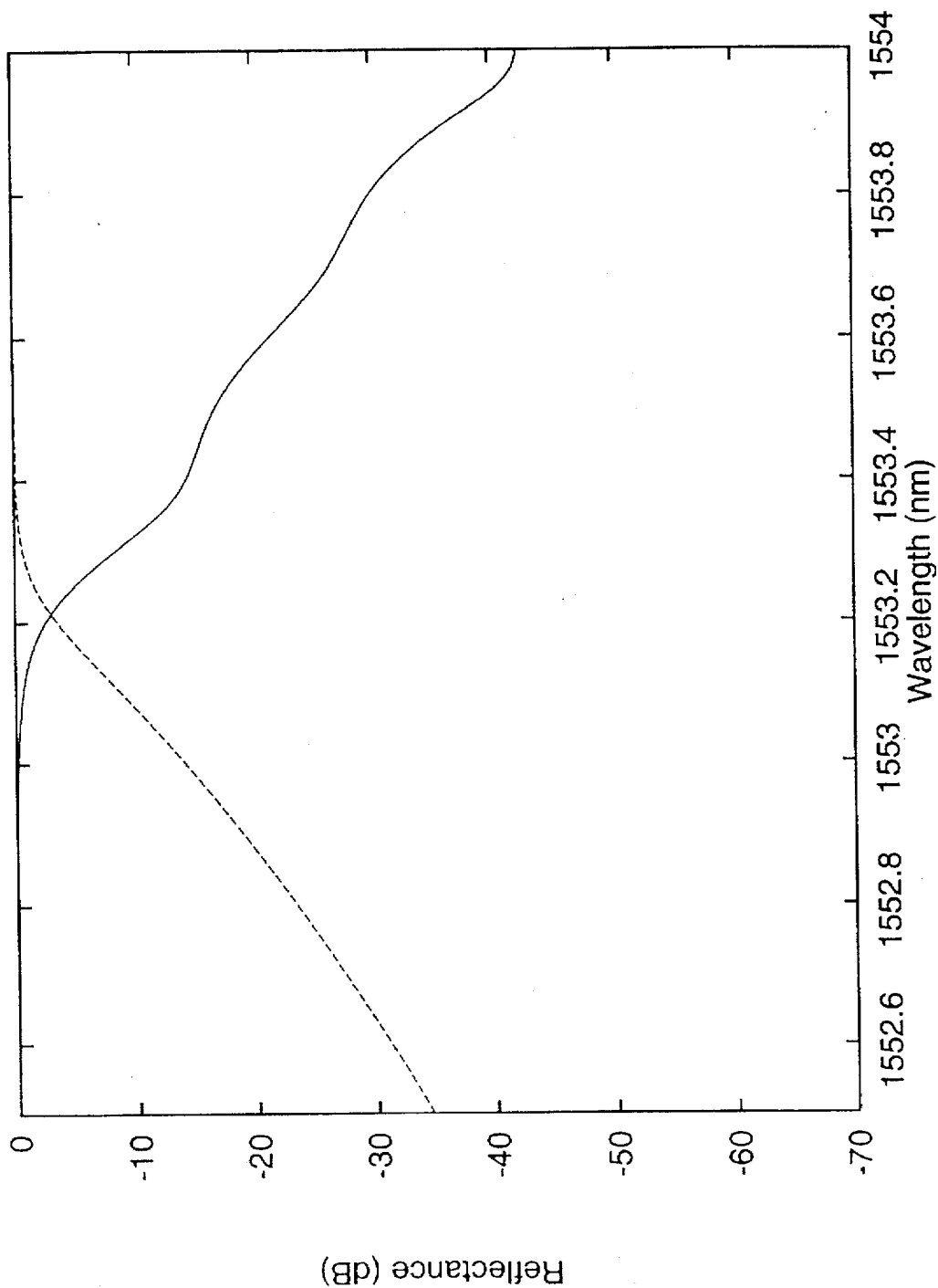
FIG. 15 depicts plots, on the same scale as in FIG. 14, a portion of the spectral reflectance and transmittance characteristics of an optimised linearly chirped filter.

FIG. 14 shows, on a larger scale, a portion of the computed spectral reflectance and transmittance characteristics of the filter of FIG. 13, illustrating its relatively rapid roll-off. For purposes of comparison, FIG. 15 shows an equivalent portion of the computed spectral reflectance and transmittance characteristics of a filter of the same length (25 mm), the same peak coupling coefficient (3/mm), and the same normalised half-width (0.2), but with a linear chirp, and with a near-optimised normalised transition half-width (0.05).

Figure 16:
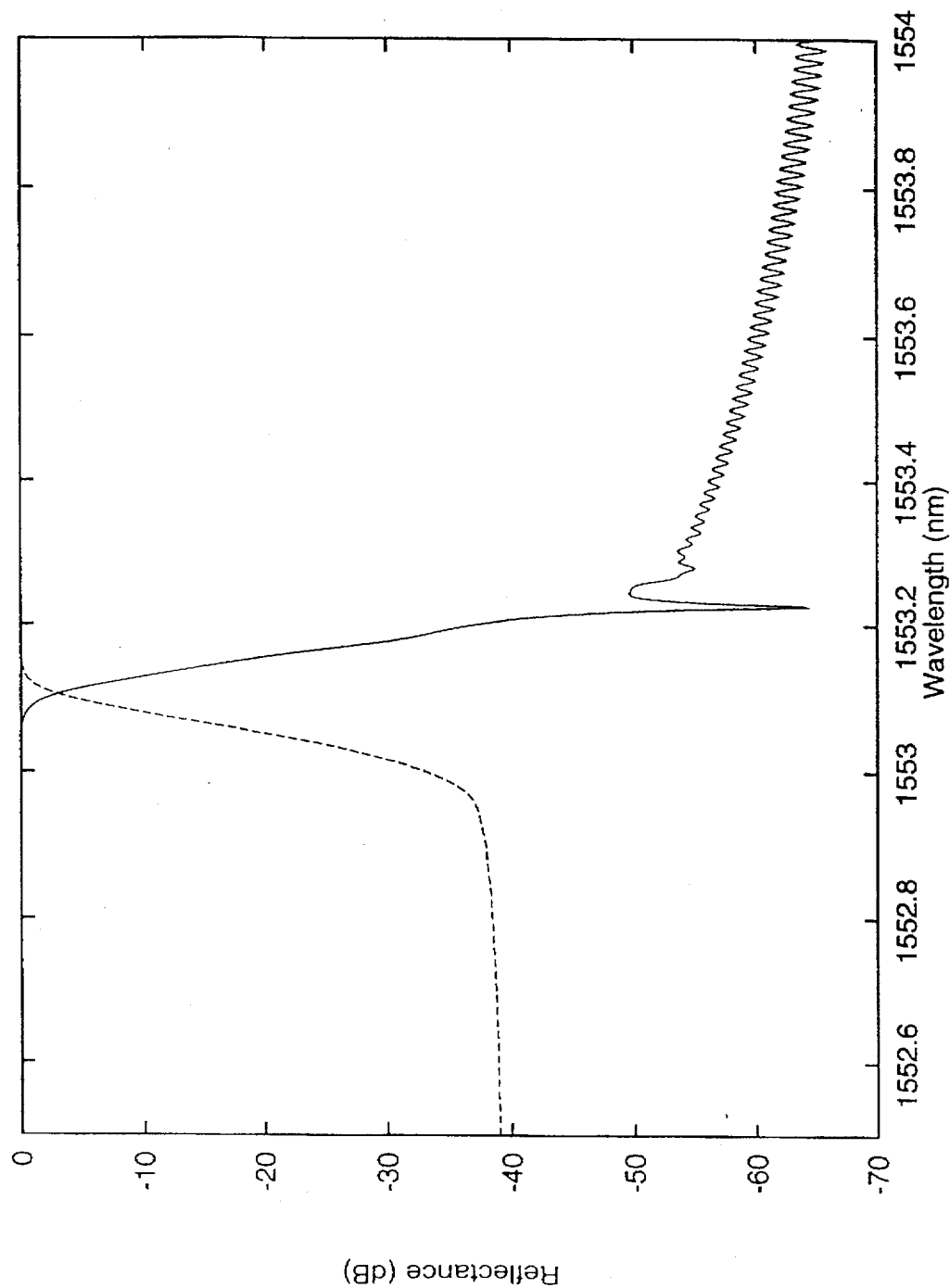
FIG. 16 depicts plots corresponding to those of FIG. 14, but in respect of a longer filter with a reduced amplitude peak coupling coefficient, and FIGS. 17A and 17B respectively depict a diagram of an optical fibre provided with an apodised non-linearly chirped Bragg filter, and plots of its apodisation and chirp profiles.

FIG. 16 shows a portion of the computed spectral reflectance and transmittance characteristics of a filter providing characteristics improved somewhat over those of the filter of FIG. 14 achieved by the use of a non-linearly chirped (chirp rate directly proportional to $\kappa^2$) Gaussian apodised filter twice as long (50 mm) as the filter of FIG. 14, having the same normalised half-width (0.2), but a peak coupling coefficient reduced from 3.0/mm to 2.3/mm. This use of longer gratings with a lower peak coupling coefficient eases some fabrication issues and, in suitable circumstances, may allow high performance filters to be manufactured without recourse to hydrogen loading.

Figure 17A:
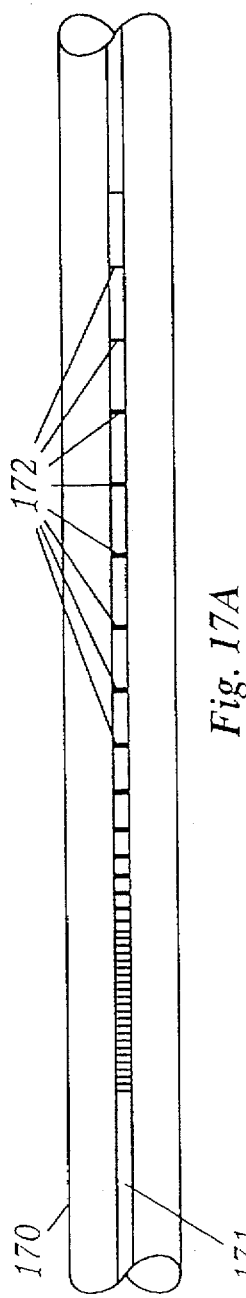
Figure 17B:
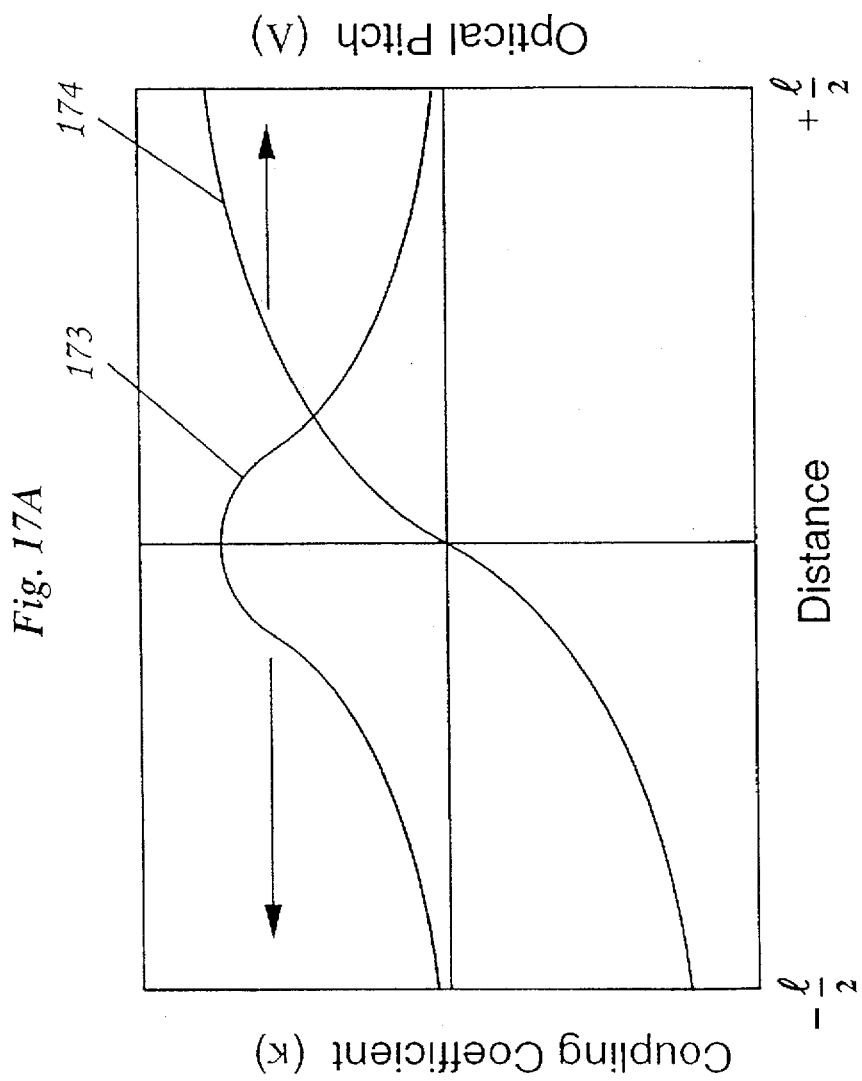

Referring now to FIGS. 17A and 17B, an optical waveguide filter embodying the invention in a preferred form is constructed in a length 170 of single mode optical fibre waveguide provided with an optical core 171. A distributed Bragg grating, the individual elements of which are schematically represented by lines 172, may be photo-induced in the fibre 170 holographically, or with the aid of a photomask. Alternatively the grating elements may be written directly, using for instance an E-beam, UV, X-ray, or other ionising radiation. In the case of writing a grating in a planar optical waveguide, photo-lithography is yet another method available for grating writing. An apodised grating is produced by varying the strength of writing of the grating elements (and hence varying their coupling coefficients $\kappa$) as a function of distance along the fibre 170. An illustrative substantially Gaussian form of this variation is represented in Fibre 17B by the trace 173. Such variation of writing strength will typically have the ancillary effect of varying, as a function of distance along the fibre, the mean effective refractive index presented by the optical fibre to propagating light. Accordingly if the grating elements were created with a uniform pitch, the very act of producing the required apodisation will typically introduce a certain measure of chirp. This chirp will not be of the requisite form to produce the required relationship between chirp rate and apodisation, and so this chirp will need to be supplemented. The required relationship is that represented in FIG. 17B by trace 174, this satisfying the relationship $$d\Lambda/dz \propto \kappa^2$$

where z is the distance along the grating from $$z=-l/2 \text{ to } z=+l/2$$

This supplementary chirp can be provided in a number of ways. If the grating elements are individually directly written, then their physical spacing can be arranged to take the required form. Alternatively, if the grating writing employs a method that automatically produces a uniform physical pitch, then the fibre can for example be differentially strained while the elements are written, or after they have been written. Alternatively the elements can be written into fibre that has been tapered in order to provide it with a non-uniform effective refractive index. Tapering to produce the required axial profile may be achieved by taking the basic method of progressive stretching of a pair of optical fibres that is described in GB 2 150 703A for the manufacture of a tapered fused fibre coupler, and adapting it to the progressive stretching of a single fibre.

What is claimed is:

1. An optical waveguide provided with a distributed Bragg grating reflector having grating elements apodised to provide a coupling coefficient, $\kappa$, that is a function of axial distance, z, along the waveguide, and chirped to provide an optical pitch, $\Lambda$, that is also a function of axial distance z, wherein the rate of change with axial distance of optical pitch is non-linear and substantially proportional to the square of the coupling coefficient.

2. An optical waveguide as claimed in claim 1, which optical waveguide is an optical fibre waveguide.

3. An optical waveguide as claimed in claim 1, wherein the apodisation of the grating elements is substantially Gaussian.

4. An optical waveguide as claimed in claim 3, which optical waveguide is an optical fibre waveguide.

* * * * *